3,153,037
PROCESS FOR PREPARING CAPROLACTAM
Ernst A. Tomic, Wilmington, Del., assignor to E. I. du
Pont de Nemours and Company, Wilmington, Del., a
corporation of Delaware
Filed Apr. 16, 1963, Ser. No. 273,431
4 Claims. (Cl. 260—239.3)

This invention relates to the production of caprolactam by the rearrangement of cyclohexanone oxime. More particularly, this invention is concerned with an improved procedure for effecting such rearrangement.

In the well-known Beckman rearrangement cyclohexanone oxime is rearranged to obtain caprolactam which is the monomer for making 6 nylon. In commercial practice, following completion of the rearrangement, the reaction mixture is neutralized and the lactam separated from the mixture by solvent extraction or by other appropriate means. The most common neutralizing agent used is aqueous ammonium hydroxide. Thus when sulfuric acid is used as the rearrangement catalyst, the by-product of the neutralization is ammonium sulfate which cannot be reused in the process. This ammonium sulfate is generally sold for fertilizer use. However, about three pounds of ammonium sulfate is produced per pound of caprolactam, so that disposal of the by-product becomes a severe problem as the quantity of caprolactam produced is increased. Neutralization of the sulfuric acid with other bases leads to materials which are of less value or used in lesser quantity. Calcium hydroxide, for example, which is a low-cost base, would lead to calcium sulfate, which, in addition to having a low market value, is insoluble and would clog up the reaction system. Thus, the necessity for neutralizing the rearrangement acid to extract caprolactam from it adds to the cost of caprolactam.

According to the present invention, an improved process of rearranging cyclohexanone oximes to caprolactam is provided. This process comprises contacting the oxime with a molten salt mixture at a temperature of about 240° C. to 390° C., the salt mixture consisting of potassium pyrosulfate and potassium bisulfate or sodium pyrosulfate and sodium bisulfate, the pyrosulfate salt in said mixtures constituting from about 40% to 95% of the salt mixture. In a particularly preferred embodiment of this invention, the salt bath is comprised of a mixture of potassium pyrosulfate and potassium bisulfate and is maintained at a temperature of from about 330° C. to about 390° C. In a further embodiment, an inert gas is used to force the oxime into the molten salt system. The inert gas used can be helium, nitrogen, hydrogen, or any other gas not reactive with the lactam, the oxime or the fused salt system.

Figure 1:
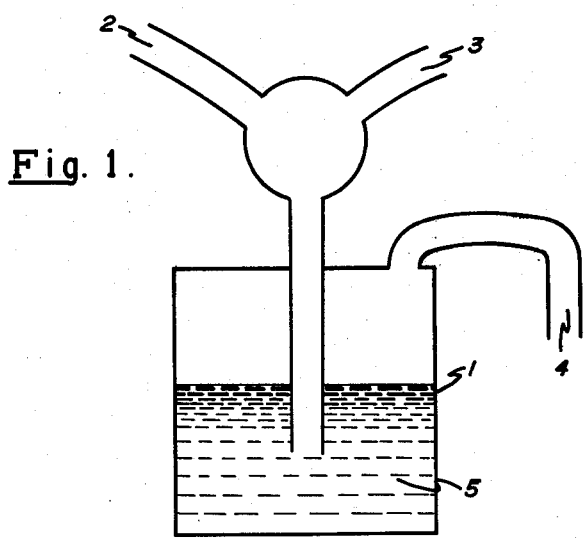

In order to more fully describe the present invention, reference is now made to FIGURE 1, which illustrates schematically one apparatus arrangement for carrying out the process of this invention. In the drawing, heated vessel 1 containing molten salt 5 has an inlet 2 for oxime, an inlet 3 for addition of water and optional addition of an insert gas, and an outlet 4 for removal of vaporized lactam.

In operation, molten oxime or a solution of the oxime is fed through inlet 2 into the molten salt 5 maintained at a temperature between about 240° C. and 390° C. The oxime is rearranged to the corresponding lactam which is vaporized and leaves the molten salt 5 via outlet 4, from whence it is condensed in a conventional cooling arrangement not shown.

In addition to using a bath of a molten salt as shown hereinbefore the molten salt and oxime can be contacted by other methods. For example, the molten salt and the molten oxime can be sprayed simultaneously into a chamber fitted with an opening from which the lactam distills and is conventionally condensed. Alternatively, a stream of molten salt can be injected into a stream of molten oxime at such a rate as to produce turbulent flow. After the necessary residence time the mixture of products flows into a chamber from which the lactam is recovered by distillation. Other of the methods conventionally used for contacting two liquid reactants can also be used.

Temperatures used are such as to keep the salt liquid and above the boiling point of the product caprolactam (about 240° C.). Generally it is difficult to keep the salt liquid below about 330° C. The preferred range of operating temperature is between about 330° and about 390° C. Above 390° C. decomposition of potassium pyrosulfate to $K_2SO_4$ and $SO_3$ starts, and decomposition of the oxime becomes appreciable.

Figure 2:
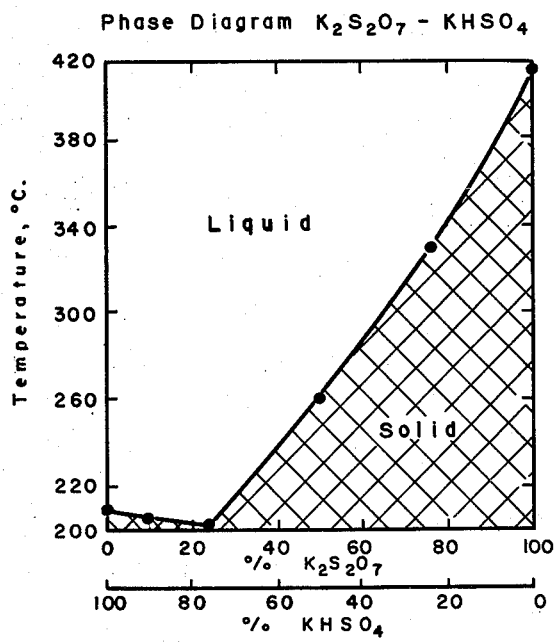

FIGURE 2 shows the phase diagram for the

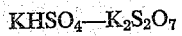

system. Any point on the solid line connecting the points in the diagram shows the melting point of the mixture of $K_2S_2O_7$ and $KHSO_4$ defined by that point. Of course, higher temperatures than the melting point can be used provided that the temperature is within the range of about 240 to 390° C. and the composition is from about 40% $K_2S_2O_7$ to about 95% $K_2S_2O_7$.

In this system $KHSO_4$ is constantly decomposing to $K_2S_2O_7$ and $H_2O$ according to the equation

and the melting point thus rises steadily. Enough water must be added to the system to maintain the $K_2S_2O_7$ concentration within the aforementioned limits. This water can be added as a finely dispersed liquid, as superheated steam or as a diluent in the inert gas stream used as an optional ingredient. The amount of water added depends on the construction of the rearrangement vessel and the temperature but is absolutely defined by the system composition limits given hereinbefore. However, as long as the melting point of the salt bath remains below the maximum operating temperature no water needs to be added. When the melting point of the bath reaches the maximum operating temperature water is added either batchwise or continuously to reduce the melting point, or at least keep it from exceeding said temperature.

The contact time of the cyclohexanone oxime in the fused salt can range from about 0.09 second to about 3 seconds. Below 0.09 second the conversion to caprolactam is very low and above 3 seconds decomposition to tars and carbon is high. The preferred range of contact time is from about 0.2 second to about 2 seconds. The contact time is defined as the average time of contact of the oxime with the molten salt, as expressed by the ratio:

$$\frac{\text{Volume of fused salt}}{\text{Volume per second of total materials fed except fused salt at operating temperature and pressure}}$$

The oxime can be added to the molten salt in the pure molten state or as a solution in a solvent not reactive to the salt bath, oxime or lactam. Solvents which are suitable include, for example, hydrocarbons such as benzene, toluene, o-xylene, m-xylene, p-xylene, pseudocumene, cyclohexane, cyclopentane; chlorinated hydrocarbons such as carbon tetrachloride, chloroform, tetrachloroethane, trichloroethylene, perchloroethylene. The concentration of oxime in the solvent is not important. Obviously very dilute solutions will be uneconomical from the heat exchange point of view.

After long periods of use the fused salt baths accumulate decomposition by-products of the reaction which consist chiefly of tars and carbon. The baths can be restored to normal activity by passing oxygen-containing gases through the fused bath at about 300–390° C. until organic constituents are oxidized.

The invention is further illustrated by reference to the following examples in addition to the examples given above. Parts are by weight.

*Example 1*

A. A solution of 7.5 parts of cyclohexanone oxime in 44 parts of toluene is injected during 5.5 hours about 4 inches below the surface of a bath of molten potassium pyrosulfate containing 10% $KHSO_4$ held at 350° to 367° C. Helium (0.0328 part per minute) is used to force the oxime under the molten salt. The contact time of the oxime in the hot salt is 0.44 second. Caprolactam is distilled off as formed and recovered in a vessel fitted with a condenser. The conversion of oxime to caprolactam is 73%. 28% of starting oxime is recovered by fractional distillation for recycle. Caprolactam produced and cyclohexanone oxime recovered are conveniently identified quantitatively by infrared means.

B. Similar results are obtained with the procedure above using 0.23 part of nitrogen per minute instead of helium.

C. Operating the procedure above without a carrier gas, and at a contact time of approximately 2 seconds, similar results are obtained.

D. Operating the procedure above using molten cyclohexanone oxime containing no solvent, and without using a carrier gas, with a contact time of approximately 3 seconds, similar results are obtained.

*Example 2*

Procedure A of Example 1 is repeated holding the salt bath at 375° C. and maintaining the contact time at 0.37 second. The conversion of oxime to lactam is 50% of theory and 24.4% of cyclohexanone oxime is recovered.

*Example 3*

The procedure in A of Example 1 is repeated using the temperatures and contact times listed in the table below, with the indicated results:

| Temp. (° C.) | Contact Time, sec. | Yield of Lactam, percent | Recovered Oxime, percent |
| --- | --- | --- | --- |
| 374–390 | 0.21 | 71.0 | 0 |
| 330–350 | 0.18 | 50.0 | 0 |
| 352–359 | 0.25 | 64.5 | 0 |
| 352–377 | 0.09 | 72.0 | 0 |
| 343–372 | 0.37 | 46.0 | 0 |

*Example 4*

The procedure in A of Example 1 is repeated using sodium pyrosulfate containing 15% $NaHSO_4$ as the molten salt held at 380° C. The contact time is 0.18 second. The yield of caprolactam is 7.5% and 0.24% of the oxime is recovered.

*Example 5*

The procedure in A of Example 1 is run continuously for 14 days, except that the reaction temperature is allowed to rise to a maximum of 370° C. as $KHSO_4$ is converted to $K_2S_2O_7$. During each day of operation sufficient water is added to the carrier gas stream to drop the melting point of the molten salt below about 370° C. The water is added to the carrier gas stream by bubbling the carrier gas through water before passing it into the reactor. Equivalent yields are obtained.

I claim:

1. A process for the manufacture of caprolactam from cyclohexanone oxime which comprises contacting said oxime with a molten salt mixture maintained at a temperature from about 240° C. to 390° C., said molten salt mixture being selected from the group consisting of a mixture containing from about 40 to 95% of potassium pyrosulfate with potassium bisulfate and a mixture containing from about 40–95% of sodium pyrosulfate with sodium bisulfate, the time of contact of said oxime with said molten salt mixture being from about 0.09 sec. to about 3.0 seconds.

2. The process of claim 1 wherein the salt bath comprises a mixture of from about 40% to about 95% potassium pyrosulate with potassium bisulfate.

3. The process of claim 2 wherein the temperature of the salt bath is from about 330° C. to about 390° C.

4. The process of claim 1 wherein said molten salt bath is maintained in the molten state by the addition of water to replace water lost by decomposition of the said bisulfates.

No references cited.